Aug. 3, 1965

V. I. ROBERTS ET AL 3,198,004

CAN TESTING VALVE

Filed Oct. 12, 1962

INVENTORS
VICTOR I. ROBERTS
& MAYNARD H. RIDDELL

BY John L. Sigalos

ATTORNEY 3,198,004
CAN TESTING VALVE
Victor I. Roberts and Maynard H. Riddell, Randolph, N.Y., assignors to The Borden Company, a corporation of New Jersey
Filed Oct. 12, 1962, Ser. No. 230,293
6 Claims. (Cl. 73—45.1)

This invention relates to improved apparatus for testing metal cans for leakage and is more particularly concerned with improved apparatus for generating a pneumatic leak signal and transmitting the same to a device which causes rejection of the leaking container.

There are available in the prior art a number of leakage testers for containers such as cans. These testers involve a conveyor which receives a can to be tested. While the can moves through the conveyor path, it is subjected to a gas pressure difference across the soldered joints, to detect leakage. If there is leakage the pressure of the leaking gas is used to actuate a faulty can reject mechanism. One form of apparatus involves a rotary type conveyor with rotating valves which control the admission of the test gas to the cans and the flow of any leakage gas to the detector and reject system. Since these are rotary valves and subjected to substantially continuous use, it has been the past practice to lubricate their abutting surfaces with a suitable hydrocarbon lubricant. While the lubrication function is adequately performed, it very often happens that the lubricant is entrained in the gas line resulting in injection of undesirable lubricant into the cans which are being tested. This is manifestly undesirable, since it requires an additional inspection of the containers to make sure they are free of lubricant before they go to the filling operation.

It is proposed according to the present invention to overcome the foregoing difficulties and to provide a rotary valve seal for a can testing mechanism that is characterized by the maintenance of an excellent seal which is entirely dry and thereby avoids any entrainment of lubricant to the containers being tested.

Other objects and advantages of this invention will be appreciated upon consideration of the detailed description of a preferred embodiment thereof in which.

Figure 1:
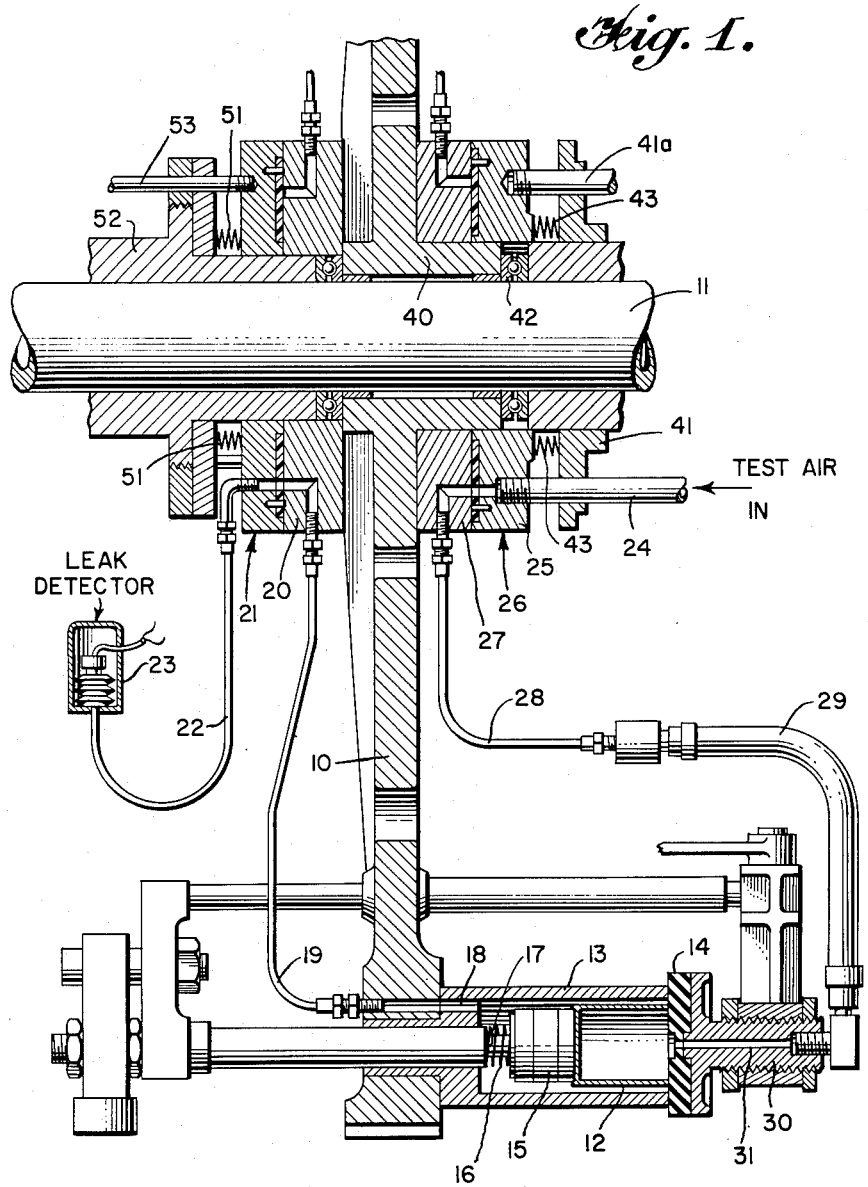
FIGURE 1 is a fragmentary view in vertical section of a portion of a conventional can testing machine modified to include the improvement of the present invention.

Referring now in greater detail to the drawing, the can tester comprises a spider 10 which is rotated on a shaft 11 through a plurality of stations arranged in arcuate sequence. These stations include a can receiving station, can testing stations to be hereinafter described and can discharge stations for both leak-proof and leaking containers. These details are not shown in FIGURE 1 since they form no part of the present invention and may be found for example in the disclosure of Patent No. 2,013,402 to Cameron.

In FIGURE 1 there is shown a can 12 in a cylindrical test container 13. The mouth of this can is pressed against a rubber seal 14 by a plunger 15 biased by a spring 16 which surrounds a rod 17 projecting within the container 13. Outside of the can 12 but within the chamber 13, there is a gas space which, through a port 18, leads to tube 19 and from thence to the rotary part 20 of the leakage gas test valve 21. The stationary, outlet side 21 of the leakage gas test valve leads through a conduit 22 to a leak detector and reject actuator mechanism generally indicated at 23.

Test air is supplied to the container 12 from a source, no shown, through a conduit 24 which leads to the fixed side 25 of a rotary valve 26, the rotating side 27 of which is connected by a tube 28 and a hose and fitting 29 to a fitting 30 which has the rubber seal 14 at its left end as it is viewed in FIGURE 1.

It can now be seen that test air under pressure enters the can to be tested through a port 31 in fitting 30. If the can does not leak, the zone within the chamber 13 remains at atmospheric pressure and the pressure difference across the can wall remains the same. If the can leaks, this zone has its pressure built up by the leaking gas and this gas is transmitted through port 18, conduit 19 and valve 21 to the reject mechanism so that the leak detector receives a signal causing the tested can to be rejected at a subsequent station on the conveyor.

All of the foregoing description involves a largely conventional arrangement and is included here for purposes of showing the environment and the utility of the improvements of the present invention. The sealing arrangement is best understood by concurrently referring to FIGURES 1, 2 and 3. At the right side of FIGURE 2 there is shown the stationary valve element 25. This element is an annular body provided with a port at 32 threaded at its right-hand side to receive the conduit 24. The inner face of the stationary valve element 25 is provided with an annular groove at 33 into which there is inserted a flat ring 34 of a material such as tetrafluoroethylene polymer, sold by E. I. du Pont de Nemours as "Teflon." The ring is held in position against rotation relative to valve member 25 by pins 35 and 36 extending parallel to the shaft 11 and by the application of an appropriate adhesive within the channel 33. The ring 34 is provided with an arcuate port at 37, so spaced radially as to register with the port 32 and so located by the pins 35 and 36 that it registers with the port 32 at one of its ends.

Figure 2:
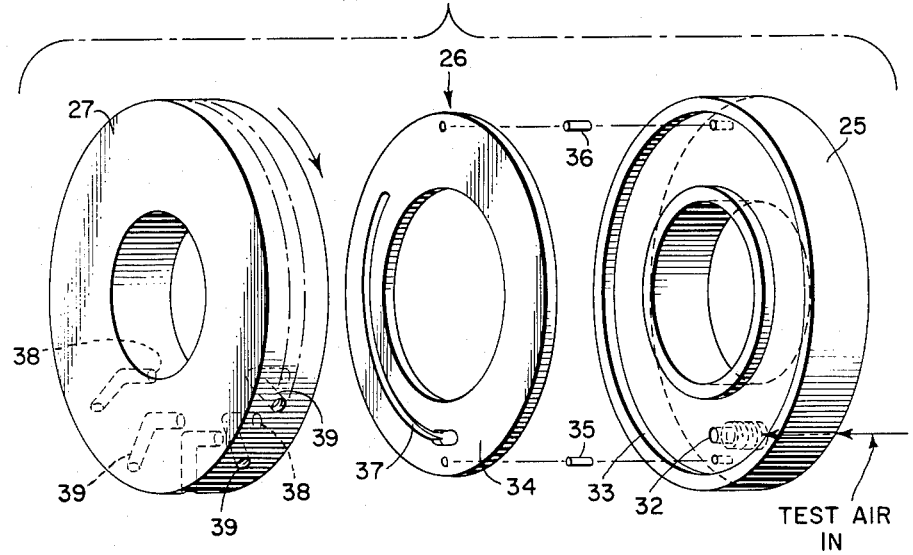
FIGURE 2 is an exploded perspective view of a preferred form of input valve constructed in accordance with the principles of the present invention.
Figure 3:
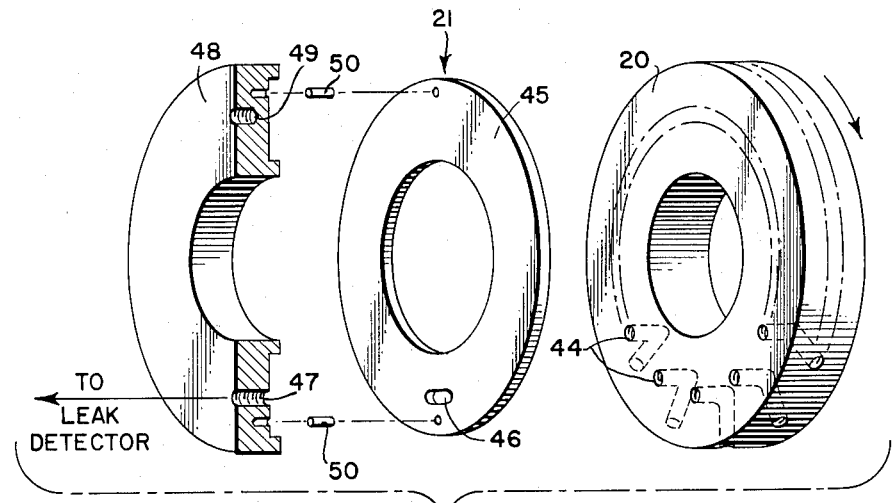
FIGURE 3 is an exploded perspective view of a preferred form of air output valve also constructed in accordance with the principles of the present invention.

As can be seen by reference to FIGURE 1, the valve element 25 is stationary and does not therefore rotate with the spider 10. The valve element 27, however, does rotate with the spider 10. This valve element 27 has a metal face which engages the ring 34, and circumferentially equally spaced about this face are a plurality of ports 38 equal in number to the can capacity of the conveyor. The annulus 27 rotates in the direction of the arrow as shown in FIGURE 2 and thus each port 38 registers successively with the beginning end of arcuate air groove 37 in ring 34. The ports 38 connect with channels 39 in the valve element 27 and each of these channels 39 receives a fitting which is the end of the respective tube 28. Of course, the container 13 and the tube 28 shown in FIGURE 1 is only one of many like pieces of equipment arranged in spaced relation around the spider 10.

If, now, reference is again made to FIGURE 1 it can be seen that valve elements 25 are mounted for sliding movement over the hub 40 of the rotary part 10. These valve elements 25 are held against rotation by the tube 24 which passes through a fixed flange 41 and by rods such as rod 41a. Bearing 42 is interposed between the fixed flange 41 and the hub 40. Circumferential shaped coil spring 43 acts resiliently to bias the stationary valve element 25 axially to the left of FIGURE 1 to cause the plastic annulus 34 tightly to engage the face of rotating valve element 27. Thus it is that as the spider 10 rotates, successive ports 38 register with the air supply groove 37 and thus each can in succession has its interior charged with gas under pressure. If there is no leak, the pressure difference across the can, i.e. between its interior and its exterior, within the chamber 13 does not change. If there is a leak, however, some of the pressure gas from the tube 24 travels through the leak in the can, enters the tube 19 and enters the rotating valve element 20 of the valve 21. Valve element 20 is in practically all respects identical to valve element 27 except that its ports face in the opposite direction. There is one port for each can on the conveyor and these ports are designated in FIGURE 3 by numeral 44. The ports 44 are in rubbing contact with the face of a ring 45 which is made of the same material as the ring 34. The ring 45 has a slotted port 46 in it which registers with a port 47 passing through a metal ring 48. The metal ring 48 has an annular groove 49 in its face, in which the ring 45 is seated. The ring 45 is held in position by pins 50 and by a suitable adhesive as was the case with ring 34.

The stationary ring 48 is pressed against the moving ring 20 by circumferentially spaced springs 51 and guidance on the sleeve 52 is accomplished by rods 53.

It can now be seen that if the can being tested leaks the leaking gas under pressure passes through the valve 21 to the detector 23. This detector being actuated by the gas operates the reject mechanism to cause the defective can not to reach its destination. The reject mechanism per se forms no part of the present invention and for that reason is not described in detail in this specification.

What is claimed is:

1. A device for detecting can leakage comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, at least one of said faces being metal and the other of a plastic material having anti-sticking properties and resistance to cold flows.

2. A device for detecting can leakage comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, at least one of said faces being metal and the other tetrafluoroethylene polymer.

3. A device for detecting can leakage comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, the stationary face of each of said valves being of tetrafluoroethylene polymer.

4. A device for detecting leakage in cans comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, the stationary valve having an annular groove in its face with an annular seal of tetrafluoroethylene polymer set therein and means to hold said annular seal in groove.

5. A device for detecting can leakage comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, at least one of said faces being metal and the other of an impervious self-lubricating, cold-flow resisting material.

6. A device for detecting can leakage comprising a conveyor for moving cans from a source to a destination, means including a first valve to establish a pressure difference across the wall of each successive can on said conveyor, means including a second valve responsive to a reduction in the pressure difference established across said can wall to prevent the leaking can from reaching said destination, said valves each including a moving part and a stationary part having abutting faces with ports which selectively register as the relative movement occurs, means to resiliently bias said faces together, the stationary face of each of said valves being an impervious self-lubricating, cold-flow resisting material.

References Cited by the Examiner

UNITED STATES PATENTS

| | | | |
|---|---|---|---|
| 1,662,761 | 3/28 | Smith | 137—625.15 |
| 2,101,129 | 12/37 | Cameron | 73—45.2 |
| 2,974,681 | 3/61 | Whitehurst | 251—368 |

ISAAC LISANN, *Primary Examiner.*